United States Patent [19]

Ibar

[11] Patent Number: 5,254,298
[45] Date of Patent: Oct. 19, 1993

[54] PLASTIC MOLDING PROCESS WITH PRECONDITIONING AND HEAT-TREATING OF MOLD AND PLASTIC BEFORE RHEOLOGICAL TRANSFORMATION

[75] Inventor: Jean-Pierre Ibar, New Canaan, Conn.

[73] Assignee: Solomat Partners, L.P., Stamford, Conn.

[21] Appl. No.: 663,989

[22] Filed: Mar. 4, 1991

Related U.S. Application Data

[63] Continuation-in-part of Ser. No. 245,412, Sep. 26, 1988, abandoned.

[30] Foreign Application Priority Data

Dec. 2, 1986 [FR] France .............................. 86 16834

[51] Int. Cl.$^5$ ............................................. B29C 35/02
[52] U.S. Cl. ........................................ 264/23; 264/39; 264/69; 264/71; 264/519; 264/237; 264/319; 264/328.16
[58] Field of Search ......................... 264/39, 23, 69, 24, 264/71, 72, 519, 520, 521, 522, 328.16, 234, 237, 319

[56] References Cited

U.S. PATENT DOCUMENTS

| | | |
|---|---|---|
| 3,888,961 | 6/1975 | Schonewald . |
| 4,150,079 | 4/1979 | Chang .................. 264/523 |
| 4,219,322 | 8/1980 | Chang et al. ............ 425/547 |
| 4,288,398 | 9/1981 | Lemelson ................ 264/23 |
| 4,435,453 | 3/1984 | Vieth et al. .............. 264/50 |
| 4,469,649 | 9/1984 | Ibar ..................... 264/319 |

FOREIGN PATENT DOCUMENTS

| | | |
|---|---|---|
| 188120 | 4/1986 | European Pat. Off. . |
| 717122 | 1/1942 | Fed. Rep. of Germany . |
| 1960129 | 7/1970 | Fed. Rep. of Germany . |
| 1919286 | 1/1971 | Fed. Rep. of Germany . |
| 2414819 | 10/1975 | Fed. Rep. of Germany . |
| 2264646 | 10/1975 | France . |
| 2451259 | 10/1980 | France . |
| 1600585 | 9/1990 | France . |
| 2170142 | 4/1986 | United Kingdom . |

OTHER PUBLICATIONS

Frados, *Plastics Engineering Handbook,* 1976, pp. 46 and 47.

Primary Examiner—Jill L. Heitbrink
Attorney, Agent, or Firm—Seidel, Gonda, Lavorgna & Monaco

[57] ABSTRACT

A process for manufacturing molded plastic products wherein the process includes:
  (a) subjecting a mold to a mold preconditioning stage by heating it to a temperature which is conducive for molding a deformable plastic material therein,
  (b) introducing a deformable plastic material into or over a cavity defined within the preconditioned mold,
  (c) molding the deformable plastic material,
  (d) heat-treating the molded plastic material by subjecting it to a treating temperature ($T_O$) which is at least equal to about 1.0 times the value of the material's glass transition temperature ($T_g$), when $T_g$ is expressed in degrees Kelvin,
  (e) subjecting the mold and the heat-treated material to a rheological transformation process preconditioning stage by adjusting the temperature to one which is conducive for a rheological transformation process,
  (f) subjecting the preconditioned material to a rheological transformation process, and
  (f) removing the molded product from the mold.

10 Claims, 1 Drawing Sheet

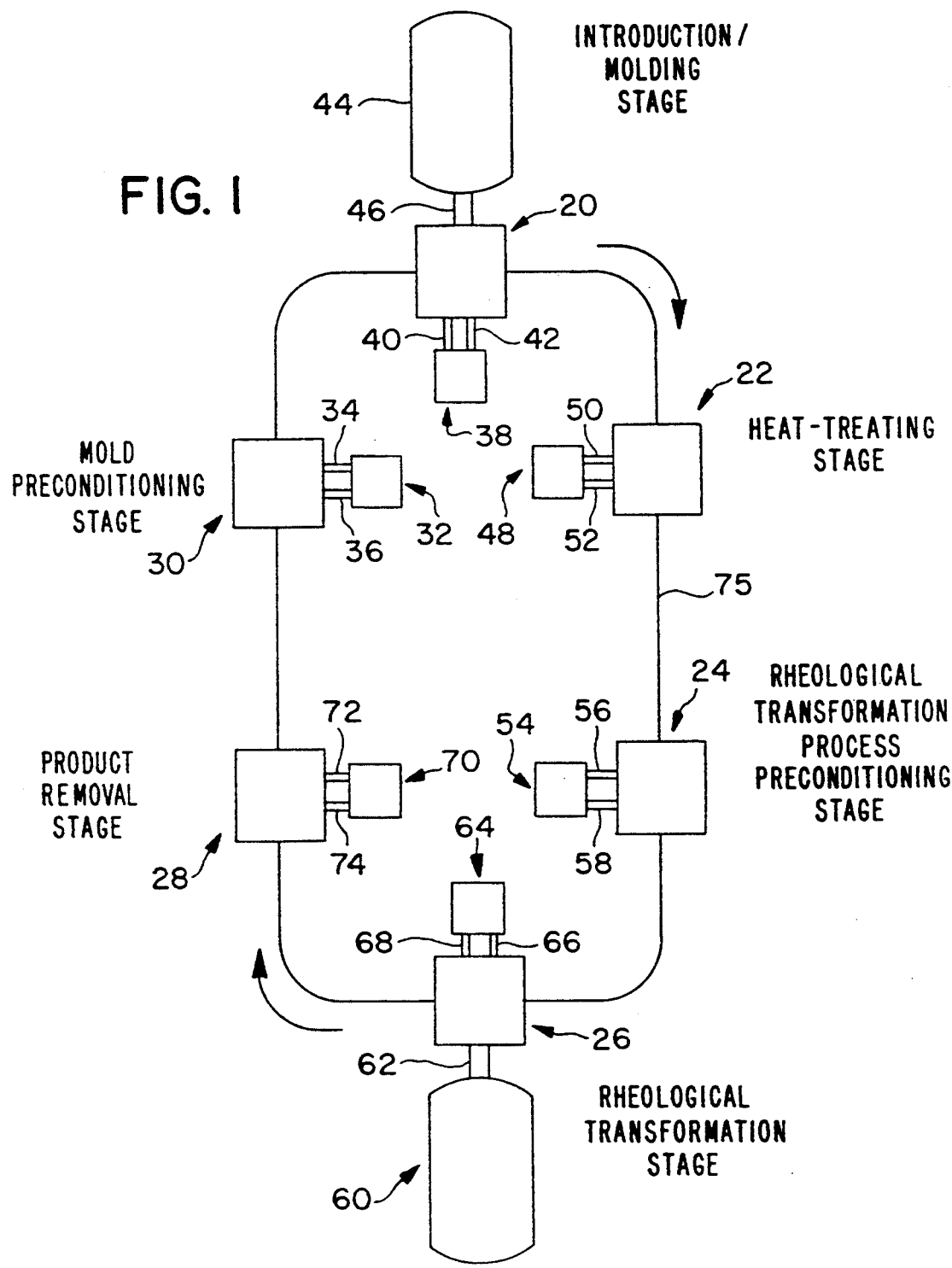

PLASTIC MOLDING PROCESS WITH PRECONDITIONING AND HEAT-TREATING OF MOLD AND PLASTIC BEFORE RHEOLOGICAL TRANSFORMATION

CROSS REFERENCE INFORMATION

This application is a continuation-in-part of U.S. application Ser. No. 245,412, filed Sep. 26, 1988, now abandoned.

FIELD OF THE INVENTION

The invention pertains to processes and means for manufacturing products by introducing a material into a mold and subsequently treating the material More particularly, the subsequent treatment of the material introduced into the mold comprises: (a) thermally treating the material and (b) pretreating the mold such that the conditions are conducive for a process whereby at least one of the material's rheological properties is controlled and/or altered.

BACKGROUND OF THE INVENTION

The present invention pertains to processes and means for manufacturing plastic or polymeric products by introducing a deformable material into a mold chamber or cavity. Such process wherein a product is fabricated in this manner are well known in the plastics industry. Examples of such types of molding techniques include, but are not limited to: compression molding, transfer molding, injection molding, blow molding, cold molding, casting, thermo-forming and the like.

The molds employed in such molding processes generally serve two separate functions. The first function is that of shaping the material being introduced therein. The second function is that of a heat exchanger for cooling the shaped material.

It is known to those skilled in the art that a molded product, which was subjected to a uniform cooling process after being molded, is generally superior to those products which were not subjected to such a cooling process. The reason for product superiority is that, as a result of uniform cooling, the degree of internal strains and stresses within the final product are reduced, izotropically distributed, or even in some instances, completely suppressed.

Due to the temperatures employed in many typical molding processes, in order to uniformly cool a product resulting therefrom, it is generally necessary to cool the product at a very slow rate. This slow cooling rate, however, runs counter to general commercial manufacturing procedures wherein there is a continued search for means which reduce production times and/or increase production yields.

As can be seen from the above, the industry is presently plagued with a dilemma since, on the one hand, there is a desirability to produce molded plastic products with superior properties and, on the other hand, there is a desirability to reduce production times (i.e., increase production yields). In other words, since quickly cooling the molded material can result in localized hot spots which, in turn, create internal strains and stresses within the product, a skilled artisan would be inclined to slowly and uniformly cool the molded product. However, since it is equally desirable to increase production yields, the same skilled artisan would have a similar inclination to rapidly cool the molded product. In view of this dilemma, the plastics industry must sometimes sacrifice product quality in favor of reduced production times and/or vice versa.

If a means can be devised which can produce a molded product with a lesser degree of internal strains and stresses, without significantly increasing production times, it would be a welcomed improvement in the plastics industry.

It is known in the industry that rheological properties of a plastic or polymeric material can be controlled and/or altered by subjecting the material to a process wherein the temperature of the material is simultaneously varied with at least one other rheological variable such as hydrostatic pressure, shear stress, mechanical vibration (frequency or amplitude), dielectric vibration (frequency or amplitude) for dielectric materials and/or electromagnetic properties for metallic materials. The variation in temperature and the simultaneous variation in one or more other rheological variables are intimately connected by a relationship selected and specifically programmed to obtain a product having improved properties. An example of such a process is disclosed in U.S. Pat. No. 4,469,649 which is incorporated herein by reference.

As used herein, the phrase "rheological transformation", as it pertains to a process or stage, generally refers to a process/stage wherein at least one of the rheological properties of a material are controlled and/or altered by subjecting the material to vibrations (e.g., mechanical or electrical) as set out above.

In conventional practices where such rheological transformation processes are employed in conjunction with a molding process, the mold containing the molded material typically remains at the site where the material was introduced into the mold (e.g., the injection site of an injection molding process) as the material receives the vibrational treatment. This practice, however, results in a significant amount of vibrational energy being lost to structures other than the material within the mold.

Due to this significant loss and/or misdirection of vibrational energy, conventional molding processes which employ such a rheological transformation stage are generally limited to the treatment of very small products (e.g., candy boxes, electrical plugs, etc.). In these circumstances, although a significant amount of vibrational energy is lost or misdirected, there is still significant levels of vibration communicated to the material within the mold.

If a means can be devised wherein a material can be efficiently subjected to a rheological transformation process as described above, regardless of the molded material's size, it would be a welcomed improvement in the plastics industry due to the many advantages associated with such rheological transformation processes.

SUMMARY OF THE INVENTION

It is an object of the present invention to provide improved molding processes which result in molded products having a lesser degree of internal strains and stresses. The improved molding processes do not have production times which are significantly greater than those of similar, conventional processes.

It is another object of the present invention to provide improved molded products having a lesser degree of internal strains and stresses.

It is even another object of the present invention to provide a means for subjecting molded plastic materials to a rheological transformation process, regardless of the material's size.

These and other objects are met by the present invention, due to the advent of an improved molded process. The improved molding process of the present invention comprises the following steps:

(a) subjecting a mold to a mold preconditioning stage by heating it to a temperature which is conducive for having a deformable plastic material molded therein, (b) introducing a deformable plastic material into or over a cavity defined within the preconditioned mold, (c) molding the deformable plastic material in accordance with a specific molding technique, (d) heat-treating the molded material by subjecting it to a treating temperature ($T_O$) which is at least equal to about 1.0 times the value of the material's glass transition temperature ($T_g$), when $T_g$ is expressed in degrees Kelvin, (e) subjecting the mold, and the heat-treated material therein, to a rheological transformation process preconditioning stage by adjusting the mold's temperature to a temperature which is conducive for having the material contained therein subjected to a rheological transformation process, (f) subjecting the heat-treated material contained within the preconditioned mold to a rheological transformation process, and (g) removing the molded product from the mold.

The molded product resulting from the above novel process has a lesser degree of internal strains and stresses when compared to similar products made by conventional molding practices. Moreover, the time necessary to complete one cycle of the present novel process is not significantly greater than that of conventional molding practices. Therefore, the present invention provides a means for significantly improving the physical properties of a molded product, without significantly increasing production times.

The present invention also provides an apparatus for carrying out the improved molding process. The apparatus comprises:

(a) a plurality of molds interconnected with one another, each of said plurality of molds defining a cavity into or over which a deformable plastic material can be introduced, (b) means for preconditioning each of said plurality of molds until the mold's conditions are conducive for having a deformable plastic material molded therein, (c) means for introducing a deformable plastic material into or over the cavity defined in each of said plurality of molds, (d) means for molding the deformable plastic material in accordance with a specific molding technique, (e) means for heat-treating said deformed material within the mold to a treating temperature ($T_O$) which is at least equal to about 1.0 times the value of the material's glass transition temperature ($T_g$), when $T_g$ is expressed in degrees Kelvin, (f) means for preconditioning the mold and the heat-treated material therein until conditions are conducive for subjecting the heat-treated material to a rheological transformation process, (g) means for treating the heat-treated material within the mold by subjecting the material to varying pressure conditions, while, simultaneously, subjecting the mold to a predetermined vibrational frequency and heat treatment in accordance with a defined rheological transformation process, (h) means for removing the molded plastic product from the mold, and (i) means for continuously cycling the plurality of molds such that each mold corresponds, in a step-wise manner, with the following means: said mold preconditioning means, said introduction means, said molding means, said heat-treating means, said rheological transformation process preconditioning means, said rheological transformation process means and said product removal means.

Other objects, aspects and advantages of the present invention will become more apparent to those skilled in the art upon reading the following detailed description, when considered in conjunction with the accompanying drawings and appended claims.

BRIEF DESCRIPTION OF THE DRAWINGS

The present invention will be described in more detail with the aid of the attached drawing briefly described below.

FIG. 1 is a diagram illustrating a means for carrying out one embodiment of an improved molding process practiced in accordance with the present invention.

DETAILED DESCRIPTION OF THE INVENTION

The present invention provides, among other things, an improved molding process. The improved molding process of the present invention comprises the following steps:

(a) subjecting a mold to a mold preconditioning stage by heating it to a temperature which is conducive for having a deformable material molded therein, (b) introducing a deformable material into or over a cavity defined within the preconditioned mold, (c) molding the deformable material in accordance with a specific molding technique, (d) heat-treating the molded material by subjecting it to a treating temperature ($T_O$) which is at least equal to about 1.0 times the value of the material's glass transition temperature ($T_g$), when $T_g$ is expressed in degrees Kelvin, (e) subjecting the mold, and the heat-treated material therein, to a rheological transformation process preconditioning stage by adjusting the mold's temperature to a temperature which is conducive for having the material contained therein subjected to a rheological transformation process, (f) subjecting the heat-treated material contained within the preconditioned mold to a rheological transformation process, and (g) removing the molded product from the mold.

In some known molding techniques, the introduction of a deformable material into a cavity defined within the mold and the actual molding of the deformable material to take the shape of the mold cavity are performed in the same step. Examples of such molding techniques having this inherent feature include, but are not limited to: transfer molding processes, injection molding processes, casting processes, and the like.

In other molding techniques, however, the deformable material, which is introduced into or over the cavity defined within the mold, does not take the shape of the mold cavity until some external pressure or vacuum is applied thereto. Examples of such molding techniques having this inherent feature associated therewith include, but are not limited to: compression molding processes, blow molding processes, thermal-forming processes, and the like.

The invention is not limited to any specific molding technique. It can be employed with molding techniques wherein the introduction and shaping of a deformable plastic material is performed in either one process step or in a plurality of process steps.

Regardless of the specific molding technique employed, one of the main features of the above novel process is the separation of the introduction and/or molding stages (i.e., steps (b) and/or (c)) from the rheological transformation stage (i.e., step (f)) by a heat-treating stage (i.e., step (d)) and a rheological transformation process preconditioning stage (i.e., step (e)). It is believed that, among other things, this separation optimizes the vibrational effects to the product and minimizes the vibrational losses to the structure during the rheological transformation stage.

Specifically, it has been discovered that, by separating the introduction and/or molding stage(s) from the rheological transformation stage, the dissipation of vibrational energy to any material or structure other than the deformable material within the mold is significantly decreased. Therefore, by practicing the present invention, the maximum amount of the vibration during the rheological transformation stage is transmitted to the product within the mold. This enables a greater control over the product's resulting physical properties. It is also believed that this separation increases production capacity.

In addition to the above, another reason for separating the introduction and/or molding stage(s) from the rheological transformation stage is that, in one rheological transformation process, it is necessary to control the history of flow and cooling of the material introduced into or over the mold cavity. This requires the deformed material to be in a "relaxed physical state" prior to the beginning of the rheological transformation process.

It has been observed that, in most conventional practices, the deformed material's stretched and pressurized state, resulting from the specific molding technique, is not its "relaxed" physical state. Therefore, a rheological transformation process as identified above usually cannot be employed with such conventional molding techniques.

In most conventional molding processes which employ a rheological transformation stage, the mold conditions (e.g., temperature) for the beginning of the rheological transformation stage are essentially the same as those at the conclusion of the introduction and/or molding stage(s). However, in the process of the present invention, after the introduction and/or molding stage(s) is completed, the molded article is first heat-treated to substantially erase at least part of the thermomechanical history resulting from the upstream stages. Then, the mold conditions are altered to make them more conducive for the downstream rheological transformation stage.

A detailed explanation of the novel process of the present invention is as follows. When practicing the present invention, the mold is first subjected to a mold preconditioning stage. Here, the temperature of the mold is adjusted such that it is more conducive for the upcoming introduction and/or molding stage(s).

After the mold has been preconditioned, a deformable material is introduced into or over a cavity defined within the mold. If the molding technique employed is one wherein the introduction and molding of the deformable material are performed in a single step, the material is introduced to the mold until it takes the shape of the mold cavity.

If, on the other hand, the molding technique employed is one wherein the introduction and shaping of the deformable material are separate steps, the material is first introduced to a position into or over the mold cavity; and then, it is subjected to a pressure or vacuum source until it takes the shape of the cavity. As stated earlier, any suitable molding technique, known to those skilled in the art, can be employed to introduce and/or shape a deformable material within the mold cavity.

After the material has taken the shape of the mold cavity, it is subjected to a heat-treating stage. During this heat-treating stage, the material is subjected to a treating temperature $(T_O)$ which is at least equal to about 1.0 times the value of the material's glass transition temperature $(T_g)$, when $T_g$ is expressed in degrees Kelvin.

In most instances when practicing the present invention, the treating temperature $(T_O)$ will range from between about 1.0 $(T_g)$ to about 2.0 $(T_g)$ of the material. Preferably, the treating temperature $(T_O)$ ranges from between about 1.1 $(T_g)$ to about 1.4 $(T_g)$ of the material; and even more preferably, from between about 1.2 $(T_g)$ to about 1.3 $(T_g)$ of the material.

It has been discovered that, among other things, this heat-treating step accomplishes the following objectives: (a) it aids in relaxing the internal stresses and strains built up in the material during the introduction and/or molding stage(s), and (b) it aids in releasing the inhomogeneous degree of orientation resulting from shear flow rates which are different at the points where the deformed material contacts the mold cavity wall surfaces, and the points within the core of the deformed material.

The process of this invention can be employed if the material being molded therein is either a homogeneous material or a blend of a plurality of components. If a homogeneous material is being employed, the glass transition temperature $(T_g)$ is that of the particular material being used. However, if the material being introduced into the mold cavity is a blend of a plurality of components, the glass transition temperature $(T_g)$ which will be used to calculate the treating temperature $(T_O)$ is that of the component having the highest glass transition temperature $(T_g)$.

After the molded material has been heat-treated, the mold and the material contained therein is subjected to a rheological transformation process preconditioning stage. In this preconditioning stage, the mold's temperature is adjusted such that conditions are conducive for subjecting the material contained therein to a rheological transformation process. The specific parameters for preconditioning the mold and the material contained therein will depend upon different variables such as, for example, the specific rheological transformation process which will be used, the specific type of molding technique employed (e.g., injection molding, blow molding, etc.), the chemical composition of the deformable material, the physical dimensions of the molded article, the specific rheological properties which are sought to be altered or controlled, and the like.

Once the rheological transformation process preconditioning stage is completed, the material contained within the mold is subjected to a specific rheological transformation process. Any suitable rheological transformation process known to those skilled in the art can be employed when practicing this present invention. An example of such a suitable rheological transformation process is that described in U.S. Pat. No. 4,469,649, which, as stated earlier, is incorporated herein by reference.

The rheological transformation stage of the present invention is followed by the removal of the molded product from the mold. This removal process, which depends, in part, to the specific molding technique employed, can also be accomplished by any suitable means known to those skilled in the art.

As stated earlier, in conventional molding practices which employ a rheological transformation stage, the mold remains at the introduction and/or molding site(s) as it receives the vibrational treatment from the rheological transformation stage. Applicant has discovered that this results in a significant amount of vibrational energy being lost to structures other than the material within the mold.

Due to this significant loss and/or misdirection of vibrational energy, conventional molding processes which employ a rheological transformation stage are generally limited to the molding of very small products (e.g., candy boxes, electrical plugs, etc.). In these circumstances, although a significant amount of vibration energy is lost or misdirected, there are still significant levels of vibration energy communicated to the material within the mold.

As can be seen from the above, the present invention is uniquely different from such conventional molding processes. For example, the present invention employs a heat-treating stage (i.e., step (d)) and a rheological transformation process preconditioning stage (i.e., step (e)) between the introduction and/or molding stage(s) and the rheological transformation stage. These intermediate stages enable the effective and efficient implementation of a rheological transformation stage with a molding stage, regardless of the product size.

The intermediate stages incorporated in the process of the present invention generally consist of adjusting the temperature of the mold and the material contained therein. This temperature adjustment can be accomplished by any suitable means known to those skilled in the art. A presently preferred means of temperature adjustment comprises the circulation of a fluid(s), at a given temperature, through channels defined within the walls of the mold body. After passing through the walls of the mold body, the fluid(s) can then be recycled to a location where it is heated or cooled to the desired preconditioning or treating temperature.

If employed, the temperature adjusting fluid(s) can be circulated through the channels defined in the walls of the mold body by any suitable means known to those skilled in the art. An example of one such suitable means comprises introducing the fluid(s) into the mold body through at least one nozzle which is inserted into at least one of the channels at the appropriate time during the novel process.

The mold employed in the practice of the present invention can be used in a continuous loop design. Here, a plurality of molds will each be subjected to a multiple number of molding processes in accordance with the present invention.

If such a continuous loop design is employed it is preferred that the process of the present invention further comprises a second mold preconditioning stage. This second mold preconditioning stage will occur after the molded product has been removed from the mold but before the mold begins the next molding process.

The purpose of this second mold preconditioning stage is to re-adjust the mold conditions such that they are again conducive for an upcoming introducing and/or molding stage(s). The means for preforming this second mold preconditioning stage can be any suitable means known to those skilled in the art.

If the means by which this second mold preconditioning stage is accomplished comprises the implementation of a nozzle which is inserted into at least one of the channels defined within the walls of the mold body, this nozzle can be in constant communication with the mold body throughout the novel molding process disclosed herein. In this instance, prior to the first injection stage, the temperature of the fluid(s) passing through the nozzle will be employed to adjust the temperature of the mold such that the conditions are more conducive for having a deformable material introduced and/or molded therein or thereover.

Then, after the introduction and/or molding stage(s) are completed, the temperature of the fluid(s) passing through the nozzle will be adjusted to heat-treat the deformed material within the mold to the desired treating temperature ($T_O$). Thereafter, the temperature of the fluid(s) passing through the nozzle will be again adjusted until the mold conditions are conducive for the upcoming rheological transformation stage.

Once the rheological transformation stage is completed and the product has been removed from the mold, the temperature of the fluid(s) passing through the nozzle will be adjusted to precondition the mold such that the conditions are again conducive for having a deformable material molded therein.

The fluid(s) employed for heating and/or cooling the mold and/or the molded article contained therein should have a good heat conduction coefficient. In addition, the fluid(s) employed for such temperature adjusting purposes should be able to sustain, without boiling or degradation, temperatures which are at least as high as those encountered in the heat-treating stage ($T_O$) and the molding and rheological transformation process preconditioning stages. Moreover, they should also be pumpable at relatively low temperatures (e.g., below about $-20°$ C).

In practice, heating and cooling fluids are alternatively circulated through the walls of the mold body to rapidly raise and/or lower the mold's temperature. Thereafter, these fluids are returned to a location for temperature recycling.

In a preferred embodiment, the heating and cooling fluid employed as the temperature-adjusting means is the same composition. One reason for preferably using the same fluid for both heating and cooling purposes is to avoid the blending of different chemicals in centralized locations such as collecting tanks, fluid passageways defined within the walls of the mold body, etc. When practicing the present invention, one example of a fluid which can be used for both heating and cooling purposes is a silicon oil.

Although the present process provides a significantly improved molded product, the total molding cycle time is not significantly increased. For example, under typical conditions, the total cycle time for a typical molding process of the present invention, wherein the molding technique is an injection molding process, is approximately as follows:

(a) for the injection stage, wherein a deformable material is introduced into a preconditioned mold until the material deforms and takes the shape of the mold (approximately from about 5 to about 30 seconds);

(b) for the heat-treating stage, wherein the thermomechanical history of the injection molded product is relaxed by heating the deformed material to the predetermined treatment temperature $(T_O)$ (approximately from about 5 to about 30 seconds);

(c) for the rheological transformation process preconditioning stage, wherein the mold conditions are made conducive for the upcoming rheological process treatment of the heat-treated material therein (approximately from about 5 to about 30 seconds);

(d) for the rheological transformation stage, wherein the physical characteristics of the relaxed injection molded article are altered by subjecting the deformed material to simultaneous, variable and programmable vibration, pressure and temperature conditions (approximately from about 30 to about 50 seconds);

(e) for the removal of the injection molded article from the mold cavity (approximately from about 0.5 to about 5 seconds); and (f) for the reconditioning of the mold to a temperature which is conducive for a subsequent injection stage as set out in step (a), above (approximately from about 30 to about 60 seconds).

It should be noted, however, that the cycle times mentioned above are only approximations. These cycle times are dependent upon many different variables such as, for example, the chemical composition of the article being molded, the thickness of the article being molded, the composition of the mold, the mass of the mold, the specific injection process employed, the specific rheological transformation process employed, the desired physical properties of the final product, and the like.

Moreover, it should also be noted that it is within the scope of this invention to have the heat-treating step and the rheological transformation process preconditioning step combined together. Here, the production time associated with practicing the present invention will be even shorter.

The present invention also provides an apparatus for carrying out the improved molding process. The apparatus comprises:

(a) a plurality of molds interconnected with one another, each of said plurality of molds defining a cavity into or over which a deformable material can be introduced, (b) means for preconditioning each of said plurality of molds until the mold's conditions are conducive for having a deformable material molded therein, (c) means for introducing a deformable material into or over the cavity defined in each of said plurality of molds (d) means for molding the deformable material in accordance with a specific molding technique, (e) means for heat-treating said deformed material within the mold to a treating temperature $(T_O)$ which is at least equal to about 1.0 times the value of the material's glass transition temperature $(T_g)$, when $T_g$ is expressed in degrees Kelvin, (f) means for preconditioning the mold with the heat-treated material therein until conditions are conducive for subjecting the heat-treated material to a rheological transformation process, (g) means for treating the heat-treated material within the mold by subjecting the material to varying pressure conditions, while, simultaneously, subjecting the mold to a predetermined vibrational frequency and heat treatment in accordance with a defined rheological transformation process to form a molded product, (h) means for removing the molded product from the mold, and (i) means for continuously cycling the plurality of molds such that each mold corresponds, in a step-wise manner, with the following means: said mold preconditioning means, said introduction means, said molding means, said heat-treating means, said rheological transformation process preconditioning means, said rheological transformation process means and said product removal means.

FIG. 1 is a diagrammatic illustration of an apparatus suitable for practicing the present invention. According to FIG. 1, the apparatus for the manufacture of molded products by the present invention comprises a plurality of molds interconnected with one another. In FIG. 1, six molds are illustrated. These molds are identified by reference numerals 20, 22, 24, 26, 28 and 30. It should be noted, however, that more or less molds can be employed when practicing the present invention.

Each of the plurality of molds defines a cavity (not shown) into or over which a deformable material can be introduced. The cavity will define the shape of the final product. Moreover, each mold has associated therewith a means for adjusting its temperature. The temperature-adjusting means for molds 30, 20, 22, 24, 26 and 28 are represented by reference numerals 32, 38, 48, 54 and 70, respectively.

In FIG. 1, mold 30 is in the mold preconditioning stage of the novel molding process. While in the mold preconditioning stage, the conditions of mold 30 are adjusted until they are conducive for having a deformable material molded therein. This preconditioning is accomplished by the implementation of a mold preconditioning means. As stated earlier, the mold preconditioning process depend largely upon the specific molding technique which will be employed.

In FIG. 1 the means by which mold 30 is preconditioned for the upcoming introduction and/or molding stage(s) is by the implementation of temperature-adjusting means 32. Although any suitable means can be employed to preconditions the mold's conditions for the downstream introduction and/or molding stage(s), the means illustrated in FIG. 1 comprises interconnecting nozzles 34 and 36 between temperature-adjusting means 32 and channels (not shown) which pass through the body of mold 30.

Once interconnected, a temperature-adjusted fluid can be passed from temperature-adjusting means 32 into mold 30 via nozzle 36; and then, from mold 30 back into temperature-adjusting means 32 via nozzle 34. The temperature of the temperature-adjusted fluid passing from temperature-adjusting means 32 to mold 30 is such that it makes the conditions of mold 30 conducive for having a deformable material introduce and molded therein.

While mold 30 is being preconditioned for the upcoming introduction and/or molding stage(s), mold 20, which has already passed through the mold preconditioning stage, is in the introduction/molding stage. For sake of simplifying the illustration, the introduction and molding stages are represented as a single step. However, as stated earlier, it is within the purview of the present invention to employ a molding technique wherein the introduction of the deformable material into or over the mold cavity and the actual molding of the deformable material are separate steps.

The temperature-adjusting means associated with mold 20 is generally referred to by reference numeral 38. The means by which temperature-adjusted fluids pass to and from temperature-adjusting means 38 and mold 20 are nozzles 40 and 42, respectively.

In most instances, it is not necessary to readjust the temperature of mold 20 while it is in the introduction/molding stage. Therefore, during the introduction/molding stage, generally no temperature-adjusted fluids are passing through nozzles 40 or 42. However, if it is desired to adjust and/or maintain the temperature of mold 20 at a particular level during the specific introduction/molding process employed, temperature-adjusting means 38 can be employed for this purpose.

While in the introduction/molding stage, a deformable material is passed from an introduction means 44 into the cavity (not shown) defined in mold 20 via passage means 46. The introduction of a deformable material into the cavity defined within mold 20 can be in accordance with any suitable technique known to those skilled in the art.

While mold 30 is being preconditioned for an upcoming introduction/molding stage, and while mold 20 is having a deformable material molded therein, mold 22, which has passed through the mold preconditioning stage and the introduction/molding stage, is having the deformed material molded therein subjected to a heat-treating stage.

The temperature-adjusting means associated with mold 22 is generally referred to by reference numeral 48. The means by which temperature-adjusted fluids pass to and from temperature-adjusting means 48 and mold 22 are nozzles 50 and 52, respectively.

During the heat-treating stage of the novel molding process of the present invention, the deformed material within mold 22 is heated to a treating temperature (T$_o$) which is at least equal about 1.0 times the value of the material's glass transition temperature (T$_g$), when T$_g$ is expressed in degrees Kelvin. In FIG. 1, the means by which the deformed material in mold 22 is heat-treated is by employing temperature-adjusting means 48. Therefore, in the embodiment of the invention illustrated in FIG. 1, temperature-adjusting means 48 is also the heat-treating means of the deformed material contained within mold 20 while mold 20 is in the heat-treating stage.

While the aforementioned upstream process stages are being performed to molds 30, 20 and 22, mold 24 is in a rheological transformation process preconditioning stage. To be in this stage with a molded article therein, mold 24 must have already passed through the introduction/molding preconditioning stage, the injection/molding stage and the heat-treating stage.

The temperature-adjusting means associated with mold 24 is generally represented by reference numeral 54. The means by which temperature-adjusted fluids pass to and from temperature-adjusting means 54 and mold 24 are nozzles 56 and 58, respectively.

During the rheological transformation process preconditioning stage, a means is employed to precondition the mold and the heat-treated material contained therein until conditions are conducive for subjecting the heat-treated material to a specific rheological transformation process. In FIG. 1, the rheological transformation process preconditioning means for mold 24 is temperature-adjusting means 54. In practice, temperature-adjusted fluids are passed between temperature-adjusting means 54 and mold 24, via nozzles 56 and 58, until the conditions of mold 24 and the heat-treated material contained therein are conducive for subjecting the heat-treated material to the upcoming rheological transformation process.

While molds 30, 20, 22 and 24 are in their respective upstream processing stages, mold 26 is in the rheological transformation stage. Mold 26 contains therein a deformed, heat-treated material (not shown). The deformed, heat-treated material in mold 26 has already passed through the introduction/molding stage, the heat-treating stage and the rheological transformation process preconditioning stage.

The temperature-adjusting means associated with mold 26 is generally referred to by reference numeral 64. The means by which temperature-adjusted fluids pass to and from temperature-adjusting means 64 and mold 26 are nozzles 66 and 68, respectively.

While in the rheological transformation stage, mold 26 and the deformed material contained therein is subjected to a defined rheological transformation process. As stated earlier, rheological transformation processes generally comprise treating a material by subjecting it to varying pressure conditions while, simultaneously, subjecting it to a predetermined vibrational frequency. As also stated earlier, any suitable rheological transformation process can be employed when practicing this present invention.

The rheological transformation means which subjects mold 26 and the material contained therein to a predetermined rheological transformation process is generally referred to by reference numeral 60. Rheological transformation means 60 is connected to mold 26 and the deformed material contained therein by connecting means 62.

In most instances, it is not necessary to readjust the temperature of mold 26 while it is in the rheological transformation stage. Therefore, during this process step generally no temperature-adjusted fluids are passed through nozzles 66 or 68. However, if it is desired to adjust and/or maintain the temperature of mold 26 at a particular level during the specific rheological transformation process employed, temperature-adjusting means 64 can be employed for this purpose.

While molds 30, 20, 22, 24 and 26 are being subjected to their respective upstream process stages, mold 28 is in the product removal stage of the present invention. The temperature-adjusting means associated with mold 28 is generally referred to by reference numeral 70. The means by which temperature-adjusted fluids pass to and from temperature-adjusting means 70 and mold 28 are nozzles 72 and 74, respectively.

During the product removal stage, the molded product, which has just been subjected to the rheological transformation stage, is removed from mold 28. Any suitable means known to those skilled in the art can be employed for removing the molded product from mold 28.

In most instances, the molded product should not be removed from its mold until the product is at a temperature which will prevent any further substantial deformation. Therefore, depending upon the specific rheological transformation process employed, it may be necessary to subject mold 28 to a cooling process. If so, temperature-adjusting means 70 can be employed for this purpose.

After the molded product has been removed from the mold, the mold can be cleaned and prepared for the next downstream mold preconditioning stage. By the implementation of this apparatus, it can easily be seen that the novel molding process of the present invention can be continued indefinitely.

The apparatus illustrated in FIG. 1 further comprises a means for continuously cycling the plurality of molds such that each mold corresponds, in a step-wise manner, with the aforementioned process stages. The means by which the plurality of molds are cycled through the individual process stages can be any suitable means known to those skilled in the art. Examples of such suitable cycling means include, but are not limited to: a circulating table system, a conveyor system, a carousel system, a combination of any of the above systems, and the like.

In FIG. 1, the means by which the plurality of molds are passed through the individual stages of the novel molding process is generally represented by reference numeral 75. In operation, after mold 30 has been preconditioned for the upcoming introduction/molding stage, cycling means 75 moves mold 30 and temperature-adjusting means 32 to the introduction/molding stage, and positions mold 30 until it is in communication with introduction means 40 and passage means 46. While in the introduction/molding stage, preconditioned mold 30 has a deformable material introduction and molded therein.

Similarly, after mold 20 has had a deformable material introduced and molded therein, cycling means 75 moves mold 20 and temperature-adjusting 38 to the heat-treating stage. While in the heat-treating stage, the deformed material contained within mold 20 is subjected to its treating temperature ($T_O$). This heat-treating is accomplished by the implementation of temperature-adjusting means 38.

After the deformed material in mold 22 has been sufficiently heat-treated in accordance with the process of the present invention, cycling means 75 also moves mold 22 and temperature-adjusting means 48 to the rheological transformation process preconditioning stage. While in the rheological transformation process preconditioning stage, the conditions of mold 22 and the heat-treated material contained therein are made conducive for the upcoming rheological transformation stage. This preconditioning is accomplished by the implementation of temperature-adjusting means 48.

After mold 24 and the heat-treated material contained therein has been subjected to the rheological transformation process preconditioning stage, cycling means 75 moves mold 24 and temperature-adjusting means 54 to the rheological transformation stage, and positions mold 24 until it is in communication with rheological transformation means 60 and connecting means 62.

While in the rheological transformation stage, mold 24 and the material contained therein are subjected to a specific rheological transformation process. If necessary, temperature-adjusting means 54 can be employed to adjust and/or maintain a specific temperature level during this process.

Mold 26, which was in the rheological transformation stage, is moved, along with temperature-adjusting means 64, to the product removal stage via cycling means 75. While in the product removal stage, the molded product in mold 26 is cooled and removed therefrom.

While mold 26 is moving from the rheological transformation stage to the product removal stage, mold 28 is moved from the product removal stage to the next mold preconditioning stage via cycling means 75. There, mold 28 is preconditioned for the upcoming introduction/molding stage. As can be seen from the above, this process can continue indefinitely.

It should be noted that the temperature-adjusting means illustrated in FIG. 1 can be stationary (i.e., the temperature-adjusting means need not move in a cycling manner with its respective mold). In this instance, the means by which the temperature-adjusting means are connected to the molds can be engaged and disengaged with the molds as they pass through the particular process stage. Moreover, if stationary temperature-adjusting means are employed, it may not be necessary to have a stationary temperature-adjusting means associated with the introduction/molding stage, the rheological transformation stage and/or the product removal stage, depending upon the specific process employed for each of these stages.

It should be noted that the present invention can be usable with any deformable "plastic" material. As used herein, the term "plastic" refers to any polymeric and/or polymer-containing material, known to those skilled in the art, which can be molded by the implementation of a mold.

It is evident from the foregoing that various modifications can be made to the embodiments of this invention without departing from the spirit and scope thereof, which will be apparent to those skilled in the art. Having thus described the invention, it is claimed as follows.

That which is claimed is:

1. A molding process for producing a molded plastic product, said process comprising the following steps:
    (a) subjecting at least one mold to a mold preconditioning stage, said mold preconditioning stage comprises heating said mold to a temperature which is conducive for having a deformable plastic material molded therein,
    (b) introducing a deformable plastic material into or over a cavity defined within said preconditioned mold,
    (c) molding said deformable plastic material in accordance with a specific plastic molding technique,
    (d) heat-treating said deformed plastic material by subjecting said material to a treating temperature ($T_O$) which is at least equal to about 1.0 times the value of said material's glass transition temperature ($T_g$), when $T_g$ is expressed in degrees Kelvin,
    (e) subjecting said mold and said heat-treated material to a rheological transformation process preconditioning stage, said rheological transformation process preconditioning stage comprises adjusting the temperature of said mold to a temperature which is conducive for having said heat-treated material subjected to a rheological transformation process,
    (f) subjecting said heat-treated material contained within said preconditioned mold to a rheological transformation process, and
    (g) removing said molded product from said mold.

2. A process as recited in claim 1 wherein said introduction of a deformable plastic material into or over said mold cavity, and wherein said molding of said deformable plastic material are performed simultaneously.

3. A process as recited in claim 2 wherein said specific plastic molding technique employed is selected from the group consisting of injection molding processes, transfer-molding processes and casting processes.

4. A process as recited in claim 1 wherein said introduction of said deformable plastic material into or over said mold cavity, and wherein said molding of said deformable plastic material are performed in a plurality of steps.

5. A process as recited in claim 4 wherein said specific plastic molding technique employed is selected from the group consisting of compression molding processes, blow molding processes and thermal-forming processes.

6. A process as recited in claim 1 wherein, after said deformable plastic material has deformed and taken the shape of said mold cavity, said deformed plastic material is subjected to a treating temperature ($T_O$) which ranges from between about 1.0 ($T_g$) to about 2.0 ($T_g$) of said plastic material, when $T_g$ is expressed in degrees Kelvin.

7. A process as recited in claim 6 wherein, after said deformable plastic material has deformed and taken the shape of said mold cavity, said material is subjected to a treating temperature ($T_O$) which ranges from between about 1.1 ($T_g$) to about 1.4 ($T_g$) of said plastic material.

8. A process as recited in claim 7 wherein, after said deformable plastic material has taken the shape of said mold cavity, said material is subjected to a treating temperature ($T_O$) which ranges from between about 1.2 ($T_g$) to about 1.3 ($T_g$) of said plastic material, when $T_g$ is expressed in degrees Kelvin.

9. A process as recited in claim 1 wherein the temperature of said mold, during at least one of said mold preconditioning stage, said introduction stage, said molding stage, said heat-treating stage, said rheological transformation process preconditioning stage, said rheological transformation process stage or product removal stage, is adjusted by having temperature-adjusted fluids circulated through channels defined within the walls of said mold body.

10. A process recited in claim 9 wherein said temperature-adjusted fluids are able to sustain, without boiling or degradation, temperatures which are at least as high as those encountered in said mold preconditioning stage, said molding stage, said heat-treating stage, said rheological transformation process preconditioning stage, said rheological transformation process stage and said product removal stage, depending upon whether temperature-adjusting is required in the specific stage and the temperature parameters of the specific stage.

* * * * *